United States Patent
Yonezawa et al.

(10) Patent No.: US 9,791,616 B2
(45) Date of Patent: Oct. 17, 2017

(54) DISPLAY APPARATUS AND METHOD OF MANUFACTURING THE DISPLAY APPARATUS

(71) Applicant: Sakai Display Products Corporation, Sakai-shi, Osaka (JP)

(72) Inventors: Nobuhiro Yonezawa, Sakai (JP); Daishi Ishikawa, Sakai (JP); Tomonori Takobe, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 34 days.

(21) Appl. No.: 14/646,292

(22) PCT Filed: Sep. 26, 2014

(86) PCT No.: PCT/JP2014/075694
§ 371 (c)(1),
(2) Date: May 20, 2015

(87) PCT Pub. No.: WO2016/046971
PCT Pub. Date: Mar. 31, 2016

(65) Prior Publication Data
US 2016/0266305 A1    Sep. 15, 2016

(51) Int. Cl.
*G02B 6/00* (2006.01)
*F21V 8/00* (2006.01)
(Continued)

(52) U.S. Cl.
CPC ......... *G02B 6/0088* (2013.01); *G02F 1/1333* (2013.01); *G02F 1/1335* (2013.01);
(Continued)

(58) Field of Classification Search
CPC ..... G02B 6/005; G02B 6/0065; G02B 6/0088
See application file for complete search history.

(56) References Cited

U.S. PATENT DOCUMENTS 8,325,291 B2 * 12/2012 Oh .................... G02F 1/133308
345/87
8,550,689 B2 * 10/2013 Han .................... G02B 6/0068
362/632
(Continued)

FOREIGN PATENT DOCUMENTS

JP     2005-347014 A    12/2005
JP     2007-232809 A    9/2007
(Continued)

*Primary Examiner* — Julie Bannan
(74) *Attorney, Agent, or Firm* — Rudy J. Ng; Bret E. Field; Bozicevic, Field & Francis LLP

(57) ABSTRACT

Provided is a display apparatus, in which a liquid crystal panel and a light guide plate 3 included in a backlight is integrated with a space held by the spacers 5, an optical sheet laminate 4 is arranged in the space between the liquid crystal panel and the light guide plate 3, being positioned by sheet positioning members 6a, and an end of the optical sheet laminate 4 is arranged between a liquid crystal panel attaching portion 52 of the spacer 5 and the light guide plate 3, so that a region exclusively occupied by the optical sheet laminate 4 on the light guide plate 3 is small, allowing a slim bezel of the display apparatus. Also provided is a method of manufacturing the display apparatus, including a first process in which the sheet positioning members 6a are attached on four corners of the light guide plate 3, a second process in which the optical sheet laminate 4 is placed on the light guide plate 3, a third process in which the spacers 5 are attached between the sheet positioning members 6a, and a fourth process in which the liquid crystal panel is attached to the spacers 5.

14 Claims, 12 Drawing Sheets

(51) Int. Cl.
*G02F 1/1333* (2006.01)
*G02F 1/1335* (2006.01)
*G09F 9/00* (2006.01)

(52) U.S. Cl.
CPC ............... *G09F 9/00* (2013.01); *G02B 6/005* (2013.01); *G02B 6/0065* (2013.01)

(56) References Cited

U.S. PATENT DOCUMENTS

| | | | |
|---|---|---|---|
| 2006/0061537 A1* | 3/2006 | Yu | G02B 6/0088 345/102 |
| 2008/0143918 A1* | 6/2008 | Kim | G02F 1/133608 349/58 |
| 2008/0170170 A1 | 7/2008 | Jung et al. | |
| 2012/0262907 A1* | 10/2012 | Lee | H05K 5/02 362/97.1 |
| 2013/0016523 A1* | 1/2013 | Urano | G02B 6/0068 362/602 |
| 2013/0169886 A1* | 7/2013 | Kuromizu | G02B 6/0088 348/739 |
| 2013/0322118 A1* | 12/2013 | Kuo | G02F 1/133308 362/611 |
| 2013/0342789 A1* | 12/2013 | Zhang | G02B 6/0088 349/65 |
| 2014/0022822 A1* | 1/2014 | Lee | G09F 13/22 362/613 |
| 2014/0112019 A1* | 4/2014 | Baek | G09F 9/30 362/613 |
| 2014/0118911 A1* | 5/2014 | Tang | G02F 1/133308 361/679.01 |

FOREIGN PATENT DOCUMENTS

| | | |
|---|---|---|
| JP | 2008-083300 A | 4/2008 |
| JP | 2008-176263 A | 7/2008 |

* cited by examiner

DISPLAY APPARATUS AND METHOD OF MANUFACTURING THE DISPLAY APPARATUS

CROSS-REFERENCE TO RELATED APPLICATIONS

This application is the national phase under 35 U.S.C. §371 of PCT International Application No. PCT/JP2014/075694, which has an International filing date of Sep. 26, 2014 and designated the United States of America.

FIELD

The present invention relates to a display apparatus comprising a backlight, and a method of manufacturing the display apparatus.

BACKGROUND

Liquid crystal display apparatuses are widespread in recent years. A liquid crystal display apparatus comprises a backlight which emits light from its surface, and a liquid crystal panel which faces the backlight and controls its transmittance of light emitted from the backlight to display an image.

A liquid crystal display apparatus is needed to be thin to improve the quality of its appearance. To make a liquid crystal display apparatus thin, it is advantageous to employ an edge-light type backlight, which comprises a light guide plate and a light source that irradiates a side surface of the light guide plate to make the light guide plate emit light from its surface. Between the light guide plate and the liquid crystal panel, optical sheets which uniformize and increase luminance of the light emitted from the light guide plate are arranged.

To make a liquid crystal display apparatus thinner, the liquid crystal panel and the backlight are required to be thin. However, when the thinness of the liquid crystal panel and the backlight is pursued, the glass substrate which is a component of the liquid crystal panel and the light guide plate which is a component of the backlight have lowered strength, making display defects likely to occur due to deformation thereof.

For such a problem, a display module included in a liquid crystal display apparatus is disclosed in Patent Document 1, in which a liquid crystal panel and a light guide plate, which is a component of a backlight, are integrated in a secured state that a spacer is sandwiched therebetween to keep a space in which optical sheets are arranged. In the display module in Patent Document 1, the entire strength of the liquid crystal panel and the light guide plate is secured because they are integrated, even when they are made thin.

PRIOR ART DOCUMENT

Patent Document

[Patent Document 1] Japanese Patent Application Laid-open Publication No. 2007-232809

SUMMARY

Problems to be Solved by the Invention

Such a display module may be manufactured in such an order that, after optical sheets are placed on a light guide plate, a spacer is secured to the light guide plate, and a liquid crystal panel is secured to the spacer secured to the light guide plate. In the foresaid order, however, when the optical sheets placed on the light guide plate sideslip, the optical sheets get sandwiched between the light guide plate and the spacer, and are prevented from expansion and contraction by heat radiated from a light source, causing wrinkles of the optical sheets and ununiform distribution of the light emitted to the liquid crystal panel, which may result in a defect such as display unevenness.

In consideration of the above-described circumstances, it is an object of the present invention to provide a display apparatus capable of preventing a defect such as display unevenness by preventing thermal expansion and contraction of an optical sheet when the optical sheet is sandwiched between a light guide plate and a spacer, and a method of manufacturing the display apparatus.

Means for Solving the Problems

According to one aspect of the present invention, there is provided a display apparatus comprising a light guide plate, a display panel facing the light guide plate through a spacer, and an optical sheet arranged between the light guide plate and the display panel, further comprising a plurality of sheet positioning members, which are attached to ends of one surface of the light guide plate and position the optical sheet.

According to the present invention, the sheet positioning members, which position the optical sheet, are attached to the ends of the light guide plate. The sheet positioning members prevent a sideslip of the optical sheet. Therefore, the sheet positioning members prevent a defect such as display unevenness caused by prevention of thermal expansion and contraction of the optical sheet when the optical sheet is sandwiched between the light guide plate and the spacer.

In the display apparatus according to the present invention, the spacer is provided between the sheet positioning members, and has an space holding portion that holds a predetermined interval between the light guide plate and the display panel, a display panel attaching portion that projects from the space holding portion in an inward direction of the display panel and is attached to the display panel, and a light guide plate attaching portion that projects from the space holding portion in an outward direction of the display panel and is attached to the light guide plate.

According to the present invention, because the display panel attaching portion, of the spacer, which is attached to the display panel, is directed toward the central part of the display panel, ends of the optical sheet are arranged between the display panel attaching portion and the light guide plate. Therefore, a region exclusively occupied by the optical sheet becomes smaller so that a so-called slim bezel of the display apparatus can be achieved.

In the display apparatus according to the present invention, the light guide plate and the display panel are rectangular, and each of the sheet positioning members is attached to each of four corners of the one surface of the light guide plate.

According to the present invention, because the sheet positioning members are attached to four corners of the light guide plate, a gap between two spacers is closed by the sheet positioning member at each of the four corners. Therefore, leakage of the light emitted from the light guide plate can be prevented.

In the display apparatus according to the present invention, each of the sheet positioning members has an L shape seen from a direction perpendicular to the one surface of the light guide plate.

According to the present invention, because each of the sheet positioning members has the L shape, the optical sheets can be positioned accurately.

In the display apparatus according to the present invention, each of the sheet positioning members is chamfered at a corner part between a surface which positions the optical sheet and a surface which faces the display panel.

According to the present invention, by a surface on the chamfered corner part of each of the sheet positioning members, the optical sheet is guided when being placed. Therefore, it is easy to place the optical sheet during the manufacturing of the display apparatus.

In the display apparatus according to the present invention, each of the sheet positioning members has a display panel positioning portion, which projects from a surface opposite to a surface attached to the light guide plate and faces a side surface of the display panel.

According to the present invention, the sheet positioning members also position the display panel. Therefore, it is easy to arrange the display panel during the manufacturing of the display apparatus.

In the display apparatus according to the present invention, the sheet positioning members are black.

According to the present invention, because the sheet positioning members are black, they can prevent leakage of the light emitted from the light guide plate, by absorbing the light.

In the display apparatus according to the present invention, the sheet positioning members are white.

According to the present invention, because the sheet positioning members are white, they can prevent leakage of the light emitted from the light guide plate, by reflecting the light.

In the display apparatus according to the present invention, the sheet positioning members are partly or wholly transparent.

According to the present invention, the sheet positioning members are partly or wholly transparent. Therefore, at inspection in the processes of manufacturing the display apparatus, the inspector can inspect the state of the optical sheet between the display panel and the light guide plate, through the sheet positioning members, by sight for example.

According to another aspect of the present invention, a method of manufacturing the above-described display apparatus, comprises, a first process of attaching the sheet positioning members to the ends of the one surface of the light guide plate, a second process of placing the optical sheet on the one surface to which the sheet positioning members are attached, a third process of attaching the spacer to a region surrounding the optical sheet on the one surface, a fourth process of attaching the display panel to the spacer.

According to the present invention, after attaching the sheet positioning members to the light guide plate, the optical sheet is placed on the light guide plate. After that, the spacers are further attached to the region surrounding the optical sheet on the light guide plate. Therefore, the optical sheet is prevented from being sandwiched between the spacer and the light guide plate due to the sideslip when placed.

Advantageous Effects

According to the present invention, it is possible to prevent a defect such as display unevenness by preventing thermal expansion and contraction of an optical sheet when the optical sheet is sandwiched between a light guide plate and a spacer.

MODES FOR CARRYING OUT THE INVENTION

The present invention will be described below with reference to the drawings illustrating the embodiments thereof.

Embodiment 1

Figure 1:
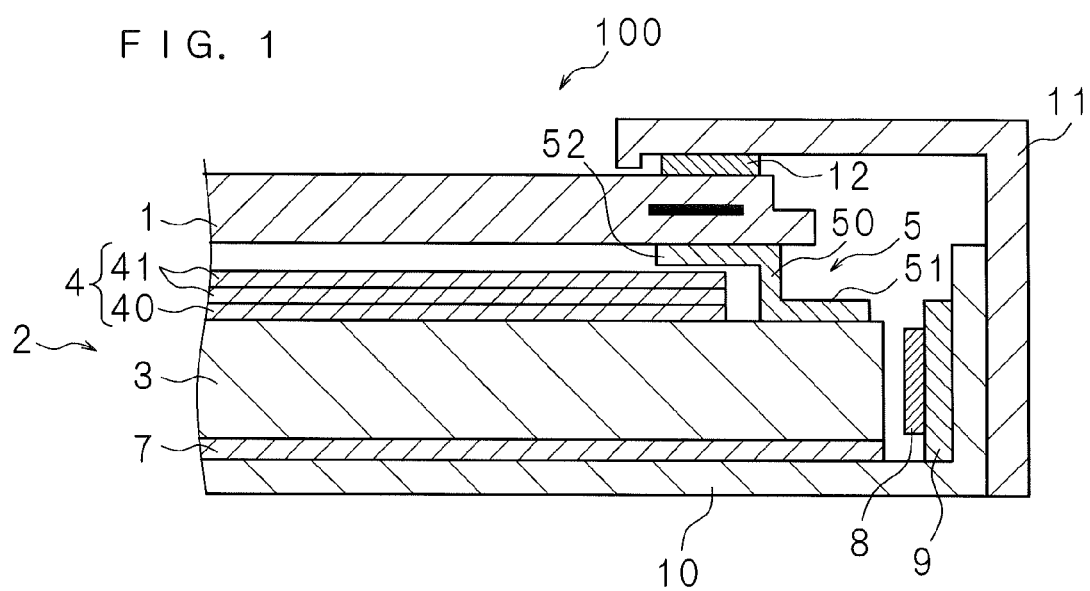
FIG. 1 is a cross-sectional view illustrating main components of a liquid crystal display apparatus according to Embodiment 1.

FIG. 1 is a cross-sectional view illustrating main components of a liquid crystal display apparatus 100 according to Embodiment 1. The liquid crystal display apparatus 100 comprises a liquid crystal panel 1 and backlight 2. The backlight 2 irradiates the liquid crystal panel 1 with light. The liquid crystal panel 1 controls its transmittance of light emitted from the backlight 2 to display an image. The backlight 2 further comprises a light guide plate 3, an optical sheet laminate 4, a reflection sheet 7, LEDs (Light Emitting Diodes) 8, and a chassis 10.

The light guide plate 3 is arranged on the chassis 10 through the reflection sheet 7. The chassis 10 has a side surface part facing a side surface of the light guide plate 3. An LED substrate 9 on which the LEDs 8 are implemented is arranged at the side surface part, making light emitted from the LEDs 8 enter the light guide plate 3 on its side surface. The light guide plate 3 is arranged to face the liquid crystal panel 1 across a space formed by spacers 5. Between the light guide plate 3 and the liquid crystal panel 1, the optical sheet laminate 4 is arranged.

In the liquid crystal panel 1, a surface facing the light guide plate 3 is a back surface, and a surface opposite to the back surface is the displaying surface which displays an image. The end of the liquid crystal panel 1 is covered by a bezel 11 joined to the chassis 10. A buffer 12 which protects the liquid crystal panel 1 is sandwiched and held between the end of the displaying surface of the liquid crystal panel 1 and the bezel 11.

The light guide plate 3 is, for example, a rectangular plate. The light guide plate 3 is formed of a transparent material, for example, acrylic resin. The light guide plate 3 emits, from the light emitting surface, on which the optical sheet laminate 4 is arranged, the light emitted from the LEDs 8 to the side surface of the light guide plate 3, to the back surface of the liquid crystal panel 1 through the optical sheet laminate 4. The light, emitted from the surface (opposite surface) to the light emitting surface of the light guide plate 3, is reflected on the reflection sheet 7 arranged on the opposite surface, and made to reenter the light guide plate 3. The reflection sheet 7 improves efficiency in utilization of the light emitted from the LEDs 8.

The liquid crystal panel 1 has, for example, a shape of a rectangular plate. The liquid crystal panel 1 is configured such that the space between two glass substrates facing each other is filled up with a liquid crystal material. The liquid crystal panel 1 alters the directions of liquid crystal molecules by controlling the voltage between the two glass substrates, in accordance with input signals, to control the amount of the transmitting light emitted from the light emitting surface of the light guide plate 3, to display an image on the displaying surface.

The optical sheet laminate 4 is configured such that one diffusion sheet 40 on the side of the light guide plate 3 and two prism sheets 41 on the side of the liquid crystal panel 1 are laminated, as shown in FIG. 1. The diffusion sheet 40 uniformizes the luminance of the incident light entering from the light guide plate 3 by diffusing it. The prism sheets 41 align the incident light, entering from the light guide plate 3 through the diffusion sheet 40, to the direction perpendicular to the prism sheets 41.

Figure 2:
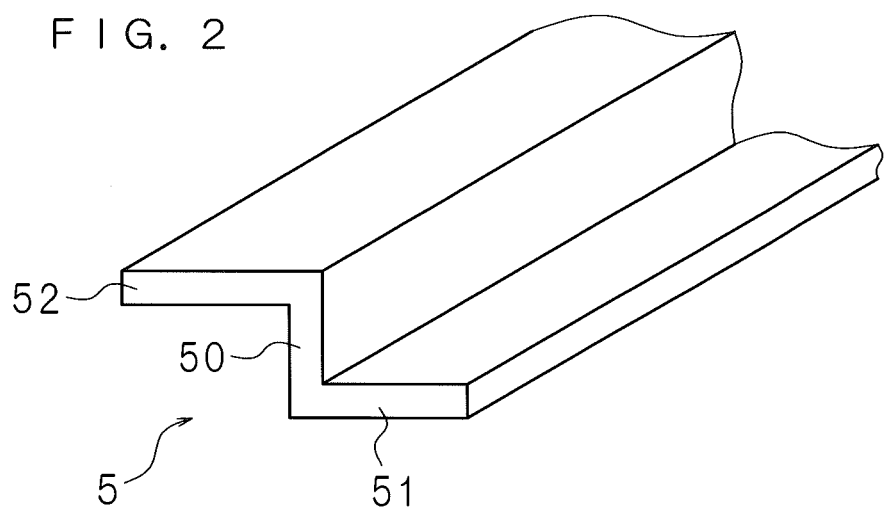
FIG. 2 is a perspective view of a spacer provided in the liquid crystal display apparatus according to Embodiment 1.

FIG. 2 is a perspective view of the spacer 5 provided in the liquid crystal display apparatus 100 according to Embodiment 1. As shown in FIG. 2, each of the spacers 5 is a rod-shaped member having a cross-sectional shape of Z. Each of the spacers 5 has a space holding portion 50, which has a shape of a long and narrow plate, and a light guide plate attaching portion 51 and a liquid crystal panel attaching portion 52, both of which have shapes of a plate and project from the lateral ends of the space holding portion 50 to respective thickness directions opposite to each other. The light guide plate attaching portion 51 are oriented to side surfaces of the light guide plate 3, and are attached to the light emitting surface of the light guide plate 3 along its edges, with double-sided tape or an adhesive for example. The liquid crystal panel attaching portion 52 are oriented to the inside of the liquid crystal panel 1, and are attached to the back surface of the liquid crystal panel 1 along its edges, with double-sided tape or an adhesive for example. Because the light guide plate attaching portions 51 and the liquid crystal panel attaching portions 52 on both ends of the space holding portions 50 are attached to the light guide plate 3 and the liquid crystal panel 1 respectively, the spacers 5 form a space where the optical sheet laminate 4 is arranged, by having a distance between the liquid crystal panel 1 and the light guide plate 3. Here, because the optical sheet laminate 4 undergoes thermal expansion and/or contraction caused by heat radiated from the LEDs 8 during its emission of light, small clearances for absorbing the expansion and/or contraction are provided between the end of the optical sheet laminate 4 and the space holding portions 50.

Additionally, for the respective attachments of the light guide plate attaching portion 51 and the liquid crystal panel attaching portion 52 to the light guide plate 3 and the liquid crystal panel 1, an attaching method of using screws may be employed. It is also be possible to employ a method of pressing the liquid crystal panel 1, the spacer 5, and the light guide plate 3 by the chassis 10 and the bezel 11.

Figure 3:
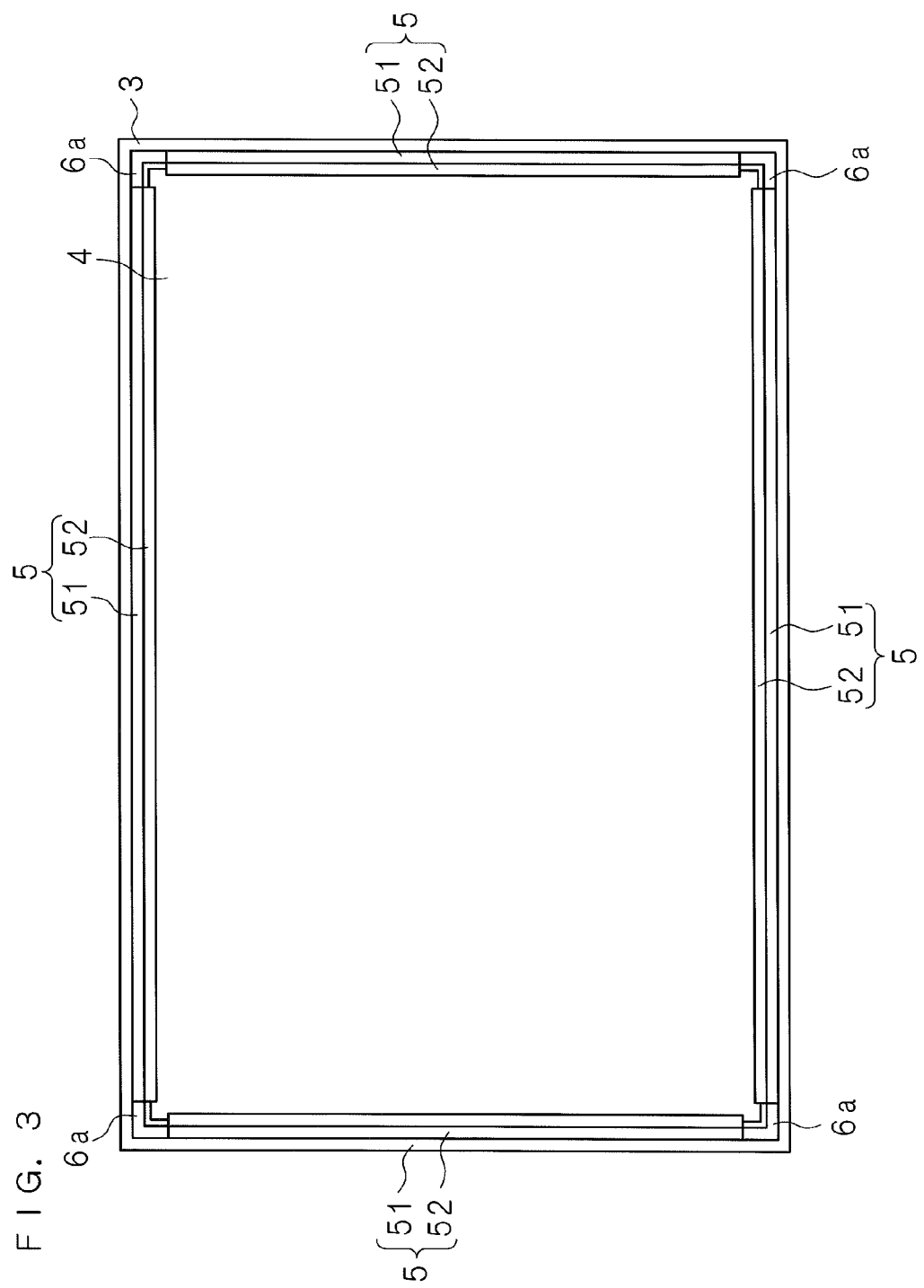
FIG. 3 is a front view of a light guide plate provided in the liquid crystal display apparatus according to Embodiment 1.

FIG. 3 is a front view of the light guide plate 3 provided in the liquid crystal display apparatus 100 according to Embodiment 1. As shown in the example of FIG. 3, a sheet positioning member 6a is arranged on each of four corners of the light emitting surface of the light guide plate 3. With an adhesive, double-sided tape or screws, for example, the sheet positioning members are attached to the light emitting surface of the light guide plate 3. Each of the sheet positioning members 6a has a shape of L as a whole.

The spacers 5 are arranged between the sheet positioning members 6a respectively. A frame surrounding the optical sheet laminate 4 is formed by the spacers 5 and the sheet positioning members 6a.

Figure 4:
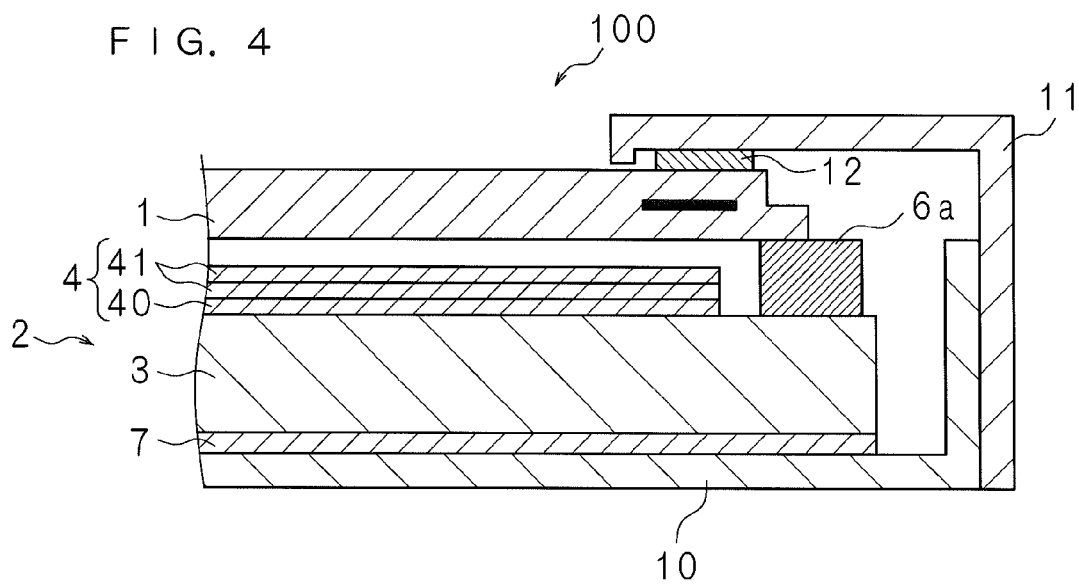
FIG. 4 is a cross-sectional view of the liquid crystal display apparatus according to Embodiment 1 at a position where a sheet positioning member is arranged.
Figure 5:
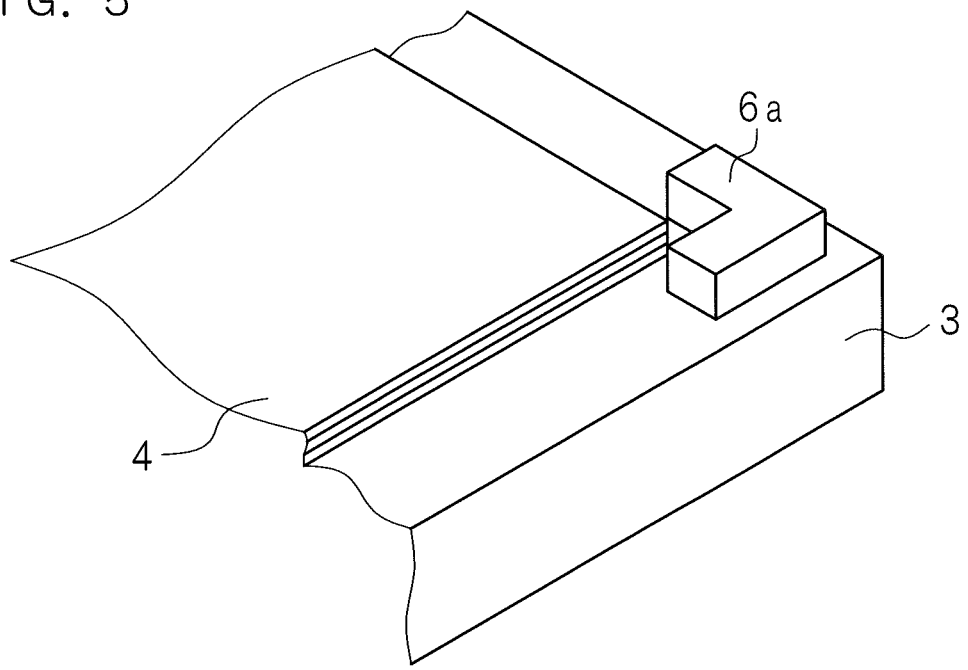
FIG. 5 is a perspective view illustrating the sheet positioning member according to Embodiment 1.
Figure 6:
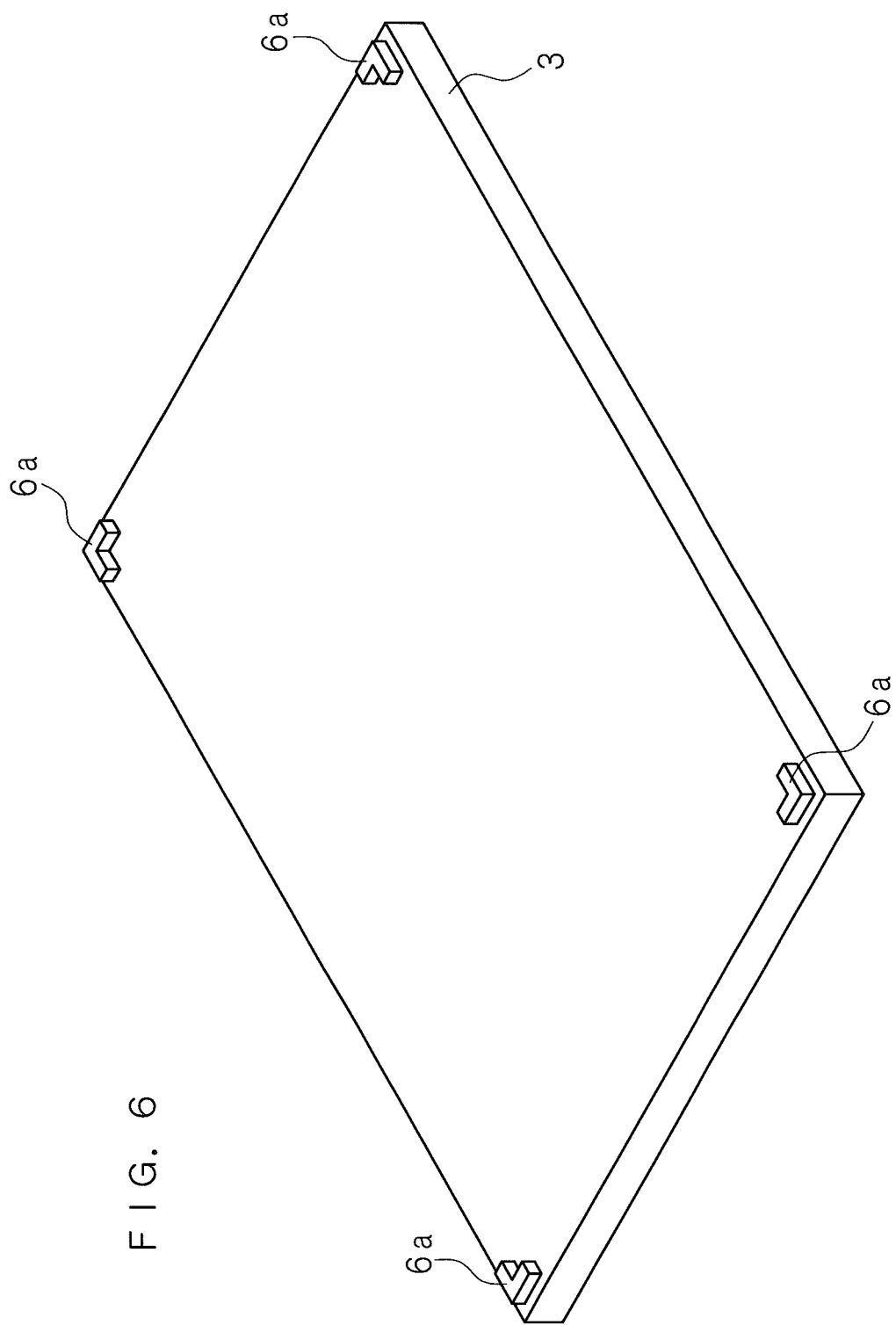
FIG. 6 is a perspective view showing a part of processes of manufacturing the liquid crystal display apparatus according to the present invention.

FIG. 4 is a cross-sectional view of the display apparatus 100 according to Embodiment 1 at the position where the sheet positioning member 6a is arranged. FIG. 5 is a perspective view illustrating the sheet positioning member 6a according to Embodiment 1. The sheet positioning members 6a position the optical sheet laminate 4 arranged on the light guide plate 3, to prevent it from sideslipping. Because the optical sheet laminate 4 undergoes thermal expansion and/or contraction, small clearances are provided between the optical sheet laminate 4 and the sheet positioning members 6a.

In addition, gaps formed between two of the spacers 5 on corners of the light guide plate 3, caused by the spacers 5 having the cross-sectional shapes of Z, are closed by the sheet positioning members 6a. Therefore, leakage of the light from these gaps can be prevented.

While the sheet positioning members 6a is not necessarily in contact with the liquid crystal panel 1, the gaps between the liquid crystal panel 1 and the sheet positioning members 6a are preferably as small as possible to prevent the leakage of the light emitted from the light guide plate 3. In addition, the spacers 5 and the sheet positioning members 6a are preferably black or white. Because the spacers 5 and the sheet positioning members 6 absorb the light if they are black and reflect the light if white, the leakage of the light from the space between the liquid crystal panel 1 and the light guide plate 3 can be prevented.

However, the sheet positioning members are not limited to the case where they are black or white. The sheet positioning members 6a may be partly or wholly transparent. When the sheet positioning members 6a are transparent, at inspection in the processes of manufacturing the liquid crystal display apparatus 100, the inspector can inspect the state of the optical sheet laminate 4 between the liquid crystal panel 1 and the light guide plate 3 of the display apparatus 100 through the sheet positioning members 6a, by sight for example.

In the liquid crystal display apparatus 100, the strength of the liquid crystal panel 1 and the light guide plate 3 is increased because they are integrated. This can prevent the strength of the liquid crystal panel 1 and the light guide plate 3 from decreasing, even when they are formed thin. In addition, because the end of the optical sheet laminate 4 and the clearances provided therearound are arranged between the light guide plate 3 and the liquid crystal panel attaching portions 52, which project from the space holding portions 50, the region exclusively occupied by the optical sheet laminate 4 on the light guide plate 3 becomes smaller. Therefore, while the size of the display region of the liquid crystal panel 1 is kept unchanged, the liquid crystal panel 1 and the light guide plate 3 can be made smaller, which allows narrowing of a so-called frame region of the bezel 11 which covers the periphery of the display region.

Figure 7:
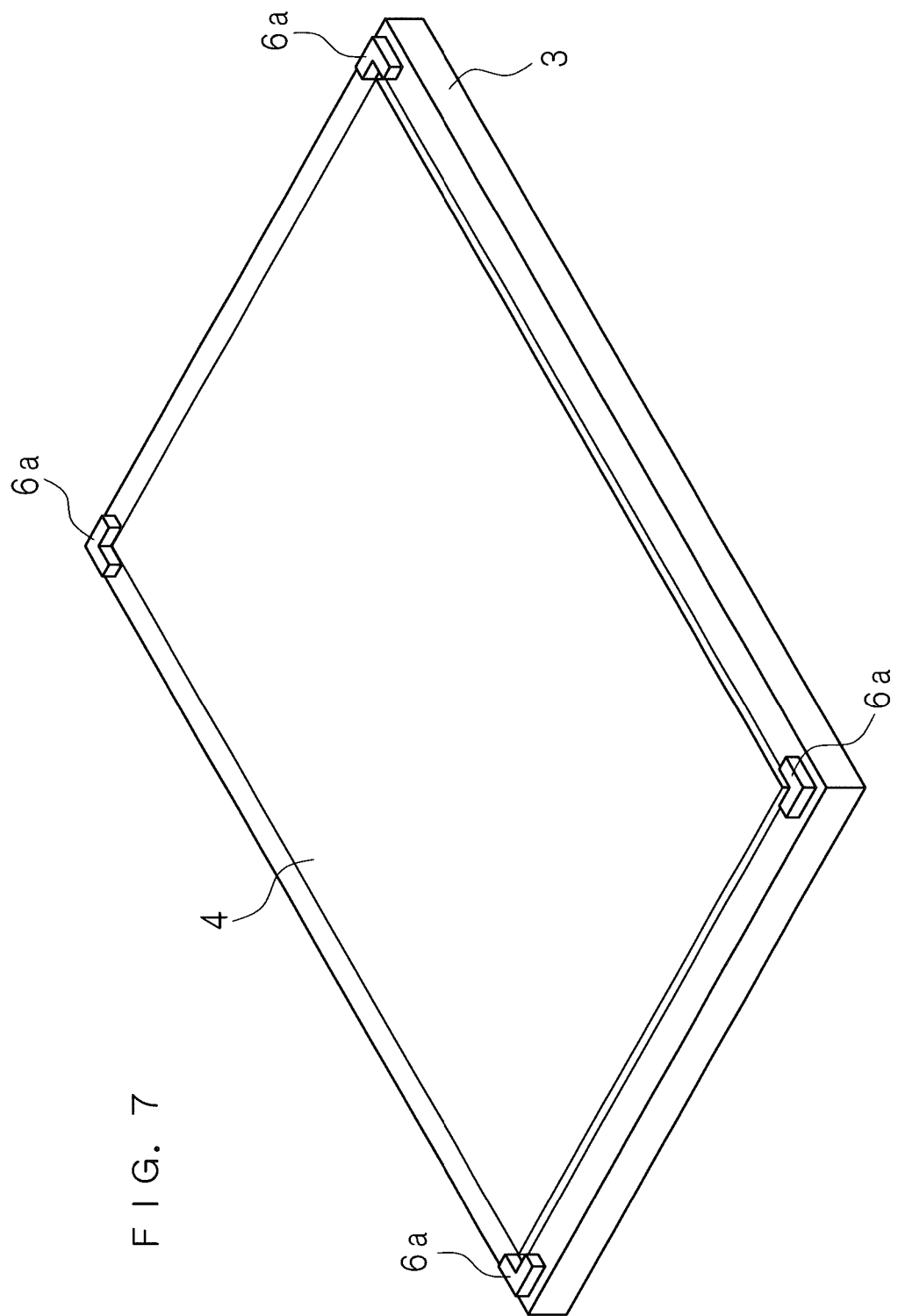
FIG. 7 is a perspective view showing a part of processes of manufacturing the liquid crystal display apparatus according to the present invention.
Figure 8:
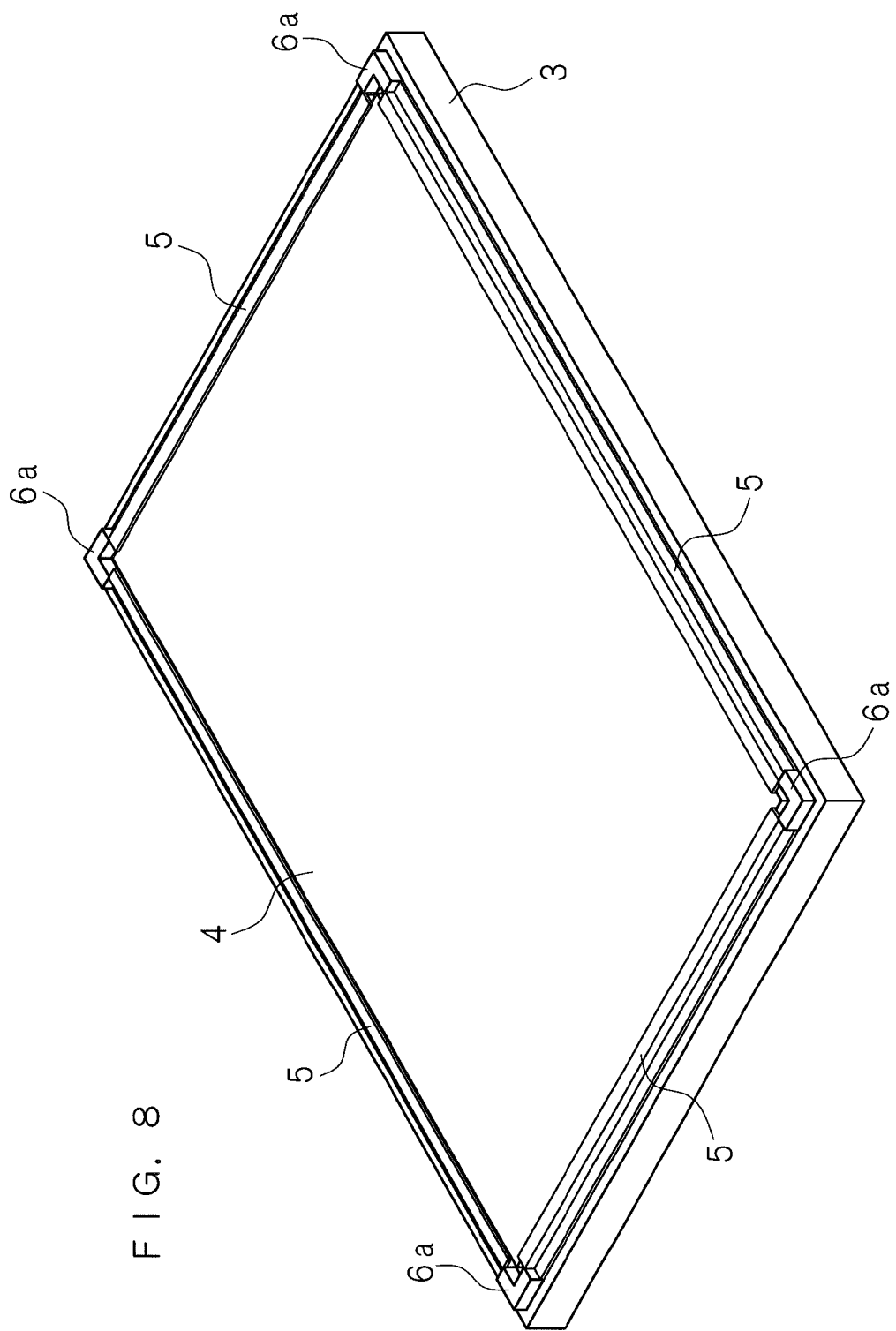
FIG. 8 is a perspective view showing a part of processes of manufacturing the liquid crystal display apparatus according to the present invention.
Figure 9:
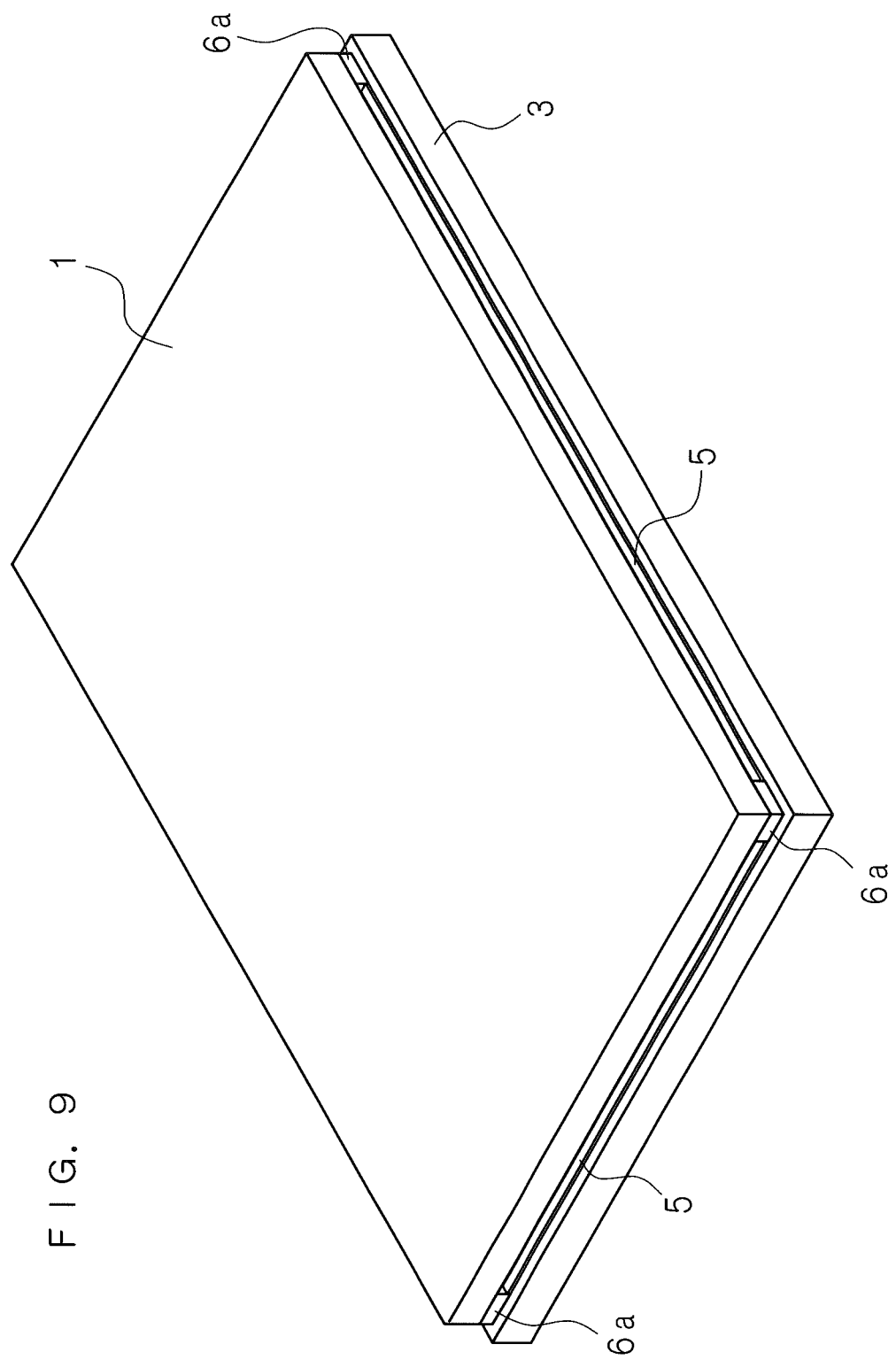
FIG. 9 is a perspective view showing a part of processes of manufacturing the liquid crystal display apparatus according to the present invention.

Each of FIG. 6 to FIG. 9 is a perspective view showing a part of processes of manufacturing the display apparatus 100 according to the present invention. In the first process shown in FIG. 6, each of the sheet positioning members 6a is attached to each of the four corners of the light emitting surface of the light guide plate 3, in such a manner that its L shape is aligned with two sides which form each of the corners of the light emitting surface. After the sheet positioning members 6a are attached, the optical sheet laminate 4 is placed at the region defined by the sheet positioning members 6a on the light emitting surface of the light guide plate 3, in the second process (FIG. 7). After the optical sheet laminate 4 is placed, spacers 5 are arranged between the sheet positioning members 6a respectively, in the third process (FIG. 8). After the spacers 5 are attached to the light guide plate 3, the liquid crystal panel 1 is attached to the spacers 5, in the fourth process (FIG. 9).

Additionally, in the abovementioned manufacturing processes, the order of the processes is not limited to the order, in which the optical sheet laminate 4 is placed after four sheet positioning members 6a are secured to four corners of the light emitting surface of the light guide plate 3. It may be an order, in which the optical sheet laminate 4 is placed after two sheet positioning members 6a are attached in a diagonal line or three sheet positioning members 6a are attached, and residual one or two sheet positioning member(s) 6a is/are then attached.

Additionally, the method of attaching the sheet positioning members 6a is not limited to the method of using an adhesive, double-sided tape, or screws. It may be possible to laminate ultraviolet curling resin or ABS resin on the light guide plate 3 with a 3D printer to form the sheet positioning members 6a.

In the abovementioned manufacturing processes, because the optical sheet laminate 4 is placed after the sheet positioning members 6a are attached to the corners of the light emitting surface of the light guide plate 3, the optical sheet laminate 4 placed is prevented from changing its position owing to a sideslip. Therefore in the following third process of attaching the spacers 5 to the light guide plate 3, there is no risk that the sideslipped optical sheet laminate 4 is sandwiched between the light guide plate 3 and the spacers 5. It is thus possible to prevent a defect such as display unevenness caused by prevention of thermal expansion and/or contraction of the optical sheet laminate 4.

As a result of the structure and the method of manufacturing as described above, it is possible to prevent the defect caused by the process of manufacturing the liquid crystal display apparatus 100.

Embodiment 2

Figure 10:
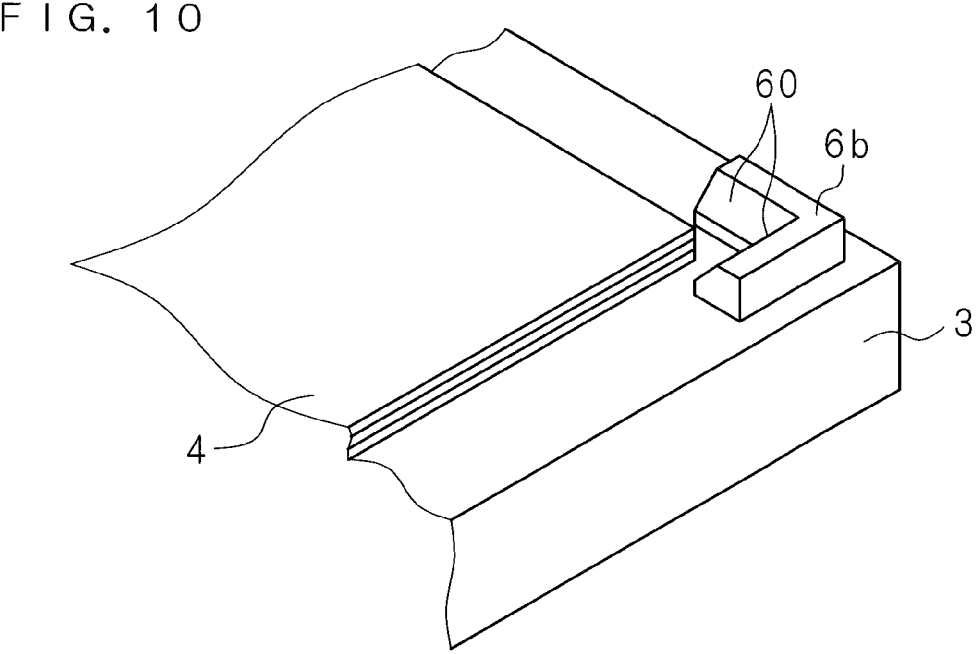
FIG. 10 is a perspective view illustrating the sheet positioning member according to Embodiment 2.

FIG. 10 is a perspective view illustrating the sheet positioning member 6b according to Embodiment 2. As shown in the example of FIG. 10, each of the sheet positioning members 6b according to present embodiment has sheet guiding surfaces 60, which are chamfered on the corner part between the surface that positions the optical sheet laminate 4 and the surface that faces the light guide plate 3. After the sheet positioning members 6b are attached to the light emitting surface of the light guide plate 3 in the first process in manufacturing, the sheet guiding surface(s) 60 guide(s) the optical sheet laminate 4 when it is arranged in the second process. This facilitates the arrangement of the optical sheet laminate 4.

Because the other parts of the structure and the method of manufacturing of the liquid crystal display apparatus 100 according to present embodiment are similar to those in Embodiment 1, detailed description thereof will not be described.

As a result of the structure described above, in the liquid crystal display apparatus according to present embodiment, the manufacturing thereof is made easier.

Embodiment 3

Figure 11:
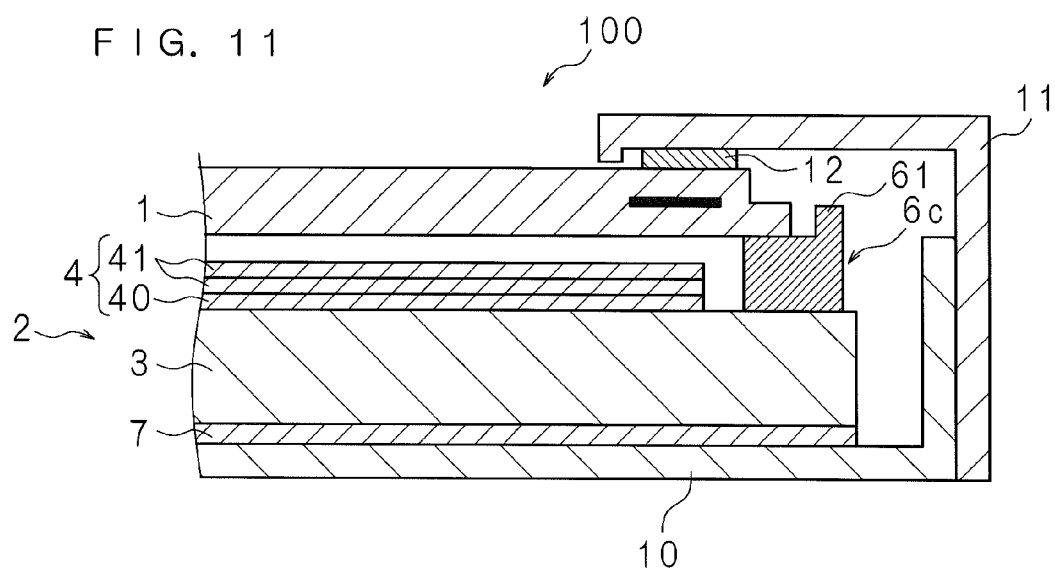
FIG. 11 is a cross-sectional view of the liquid crystal display apparatus according to Embodiment 3 at a position where the sheet positioning member is arranged.
Figure 12:
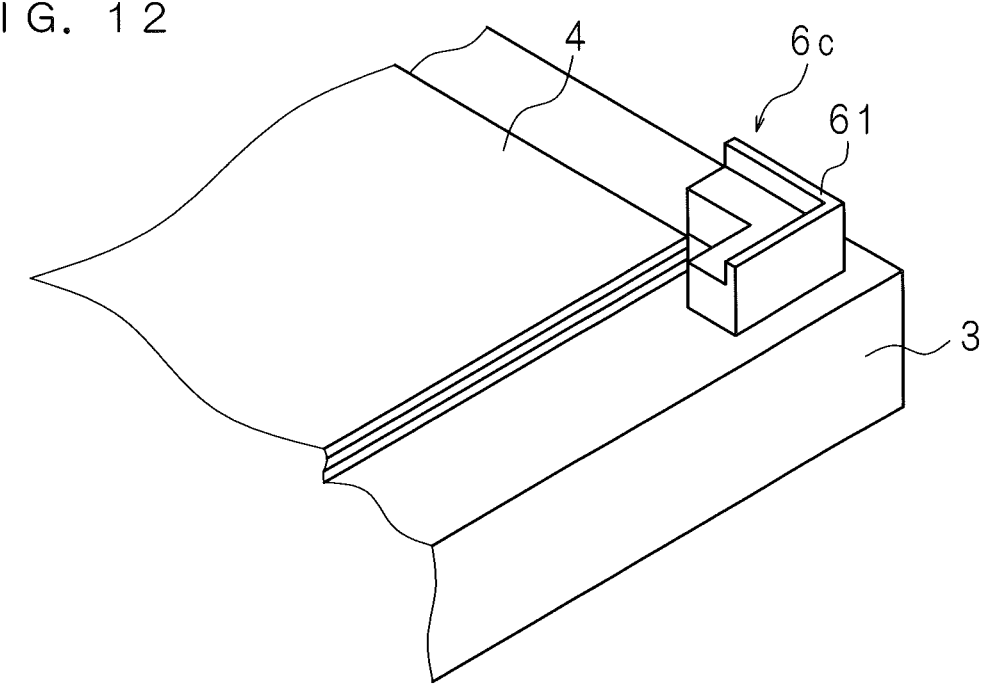
FIG. 12 is a perspective view illustrating the sheet positioning member according to Embodiment 3.

FIG. 11 is a cross-sectional view of the liquid crystal display apparatus 100 according to Embodiment 3 at a position where the sheet positioning member 6c is arranged. FIG. 12 is a perspective view illustrating the sheet positioning member 6c according to Embodiment 3. As shown in FIG. 11 and FIG. 12, each of the sheet positioning members 6c according to present embodiment has a liquid crystal panel positioning portion 61, which projects from the surface opposite to the surface attached to the light emitting surface of the light guide plate 3, to the side of liquid crystal panel 1, and faces the side surfaces of the liquid crystal panel 1.

The liquid crystal panel positioning portions 61 position the liquid crystal panel 1 at the time when the liquid crystal panel 1 is attached to the spacers 5 arranged on the light emitting surface of the light guide plate 3. Thus, attaching the liquid crystal panel 1 to the spacers 5 is made easier. Therefore, manufacturing of the liquid crystal display apparatus 100 is made easier.

Because the other parts of the structure and the method of manufacturing of the liquid crystal display apparatus 100 according to present embodiment are similar to those in Embodiment 1 and 2, detailed description thereof will not be described.

As a result of the structure described above, in the liquid crystal display apparatus according to present embodiment, the manufacturing thereof is made easier.

Additionally, in each of the abovementioned embodiments, the liquid crystal panel 1 and the light guide plate 3 are rectangular plates. However, they are not limited in such a shape. It may have another shape, for example, a circular plate.

It should be understood that the embodiments disclosed herein are illustrative and non-restrictive in every respect. Since the scope of the present invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE NUMERALS 1 liquid crystal panel
2 backlight
3 light guide plate
4 optical sheet laminate
40 diffusion sheet
41 prism sheet
5 spacer 50 space holding portion
51 light guide plate attaching portion
52 liquid crystal panel attaching portion
6a, 6b, 6c sheet positioning member
60 sheet guiding surface
61 liquid crystal panel positioning portion
7 reflection sheet
8 LED (light emitting diode)
9 LED substrate
10 chassis
11 bezel
100 liquid crystal display apparatus

The invention claimed is:

1. A display apparatus comprising a light guide plate into which light enters from a side surface of the light guide plate and which emits light from a principal surface of the light guide plate, a light source facing the side surface of the light guide plate and emits light to the side surface of the light guide plate, a display panel facing the principal surface of the light guide plate through a spacer, and an optical sheet arranged between the light guide plate and the display panel, further comprising, a plurality of sheet positioning members, which are attached to ends of the principal surface of the light guide plate and which position the optical sheet on the principal surface of the light guide plate, wherein the spacer is provided between the sheet positioning members, and has a space holding portion that holds a predetermined interval between the light guide plate and the display panel, a display panel attaching portion that projects from the space holding portion in an inward direction of the display panel and is attached to the display panel, and a light guide plate attaching portion that projects from the space holding portion in an outward direction of the display panel and is attached to the light guide plate, and clearances for absorbing one or more of expansion and contraction of the optical sheet are provided between an end of the optical sheet and the space holding portion, and between the end of the optical sheet and the sheet positioning member;

wherein:

the space holding portion forms a shape of a long and narrow plate, the display panel attaching portion forms a plate that projects from one end of the space holding portion and in a direction corresponding to a thickness of the space holding portion and wherein the display panel attaching portion extends inward toward the display panel in a direction that corresponds to a thickness of the space holding portion, and the light guide plate attaching portion forms a plate that projects from another end of the space holding portion in a direction that corresponds to a thickness of the space holding portion in an outward direction of the display panel.

2. The display apparatus according to claim 1, wherein the light guide plate and the display panel are rectangular, and each of the sheet positioning members is attached to each of four corners of the principal surface of the light guide plate.

3. The display apparatus according to claim 2, wherein each of the sheet positioning members has an L shape seen from a direction perpendicular to the principal surface of the light guide plate.

4. The display apparatus according to claim 1, wherein each of the sheet positioning members is chamfered at a corner part between a surface which positions the optical sheet and a surface which faces the display panel.

5. The display apparatus according to claim 1, wherein each of the sheet positioning members has a display panel positioning portion, which projects from a surface opposite to a surface attached to the light guide plate and faces a side surface of the display panel.

6. The display apparatus according to claim 1, wherein the sheet positioning members are black.

7. The display apparatus according to claim 1, wherein the sheet positioning members are white.

8. The display apparatus according to claim 1, wherein the sheet positioning members are partly or wholly transparent.

9. A method of manufacturing the display apparatus according to claim 1, comprising, a first process of attaching the sheet positioning members to the ends of the principal surface of the light guide plate, a second process of placing the optical sheet on the principal surface to which the sheet positioning members are attached, a third process of attaching the spacer to a region surrounding the optical sheet on the principal surface, and a fourth process of attaching the display panel to the spacer.

10. The display apparatus according to claim 1, wherein the clearances are arranged between the light guide plate and the display panel attaching portion.

11. The display apparatus according to claim 1, wherein the display panel attaching portion is attached to an edge of a back surface of the display panel by a first fixing agent, and the light guide plate attaching portion is attached to an edge of a light emitting surface of the light guide plate by a second fixing agent.

12. The display apparatus according to claim 11, wherein one or more of the first fixing agent and the second fixing agent comprises an adhesive.

13. The display apparatus according to claim 11, wherein one or more of the first fixing agent and the second fixing agent comprises double-sided tape.

14. The display apparatus according to claim 1, wherein the sheet positioning members comprise a liquid crystal panel positioning portion, which projects from a surface of the sheet positioning member opposite to a surface attached to the principal surface of the light guide plate.

* * * * *